July 6, 1965  I. A. ABERNETHY ETAL  3,192,567
MOLD ASSEMBLY FOR FORMING PREGROUTED CERAMIC TILE SHEETS
Filed Nov. 28, 1960  8 Sheets-Sheet 8
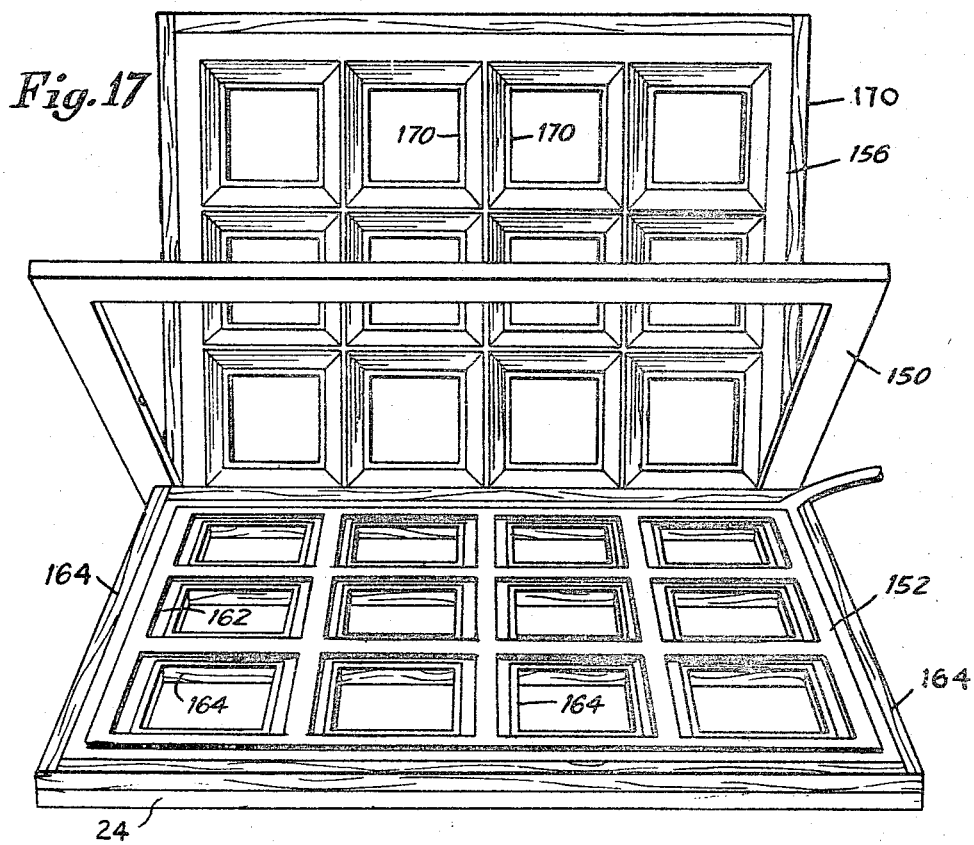
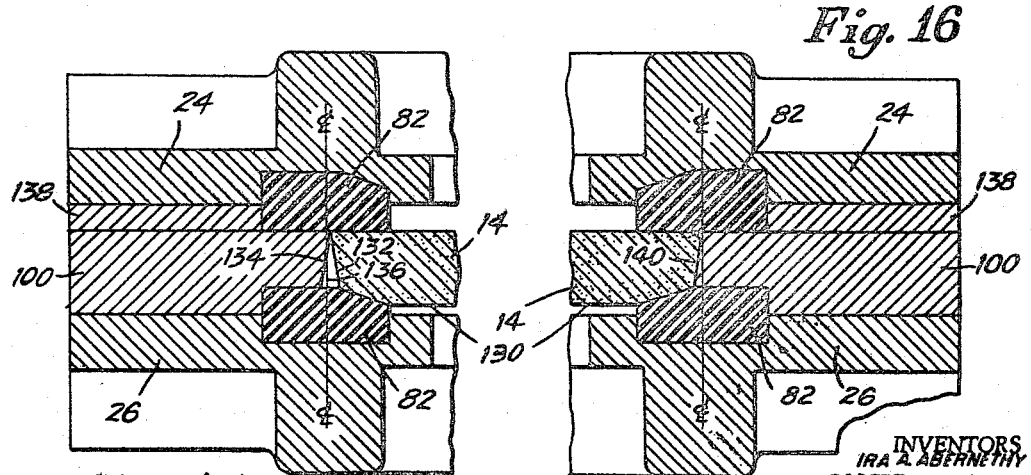
INVENTORS
IRA A. ABERNETHY
ROBERT W. VAIL
HAROLD R. FEICHTER
STEPHEN J. CABLE
BY Diggins & LeBlanc
ATTORNEYS United States Patent Office 3,192,567
Patented July 6, 1965

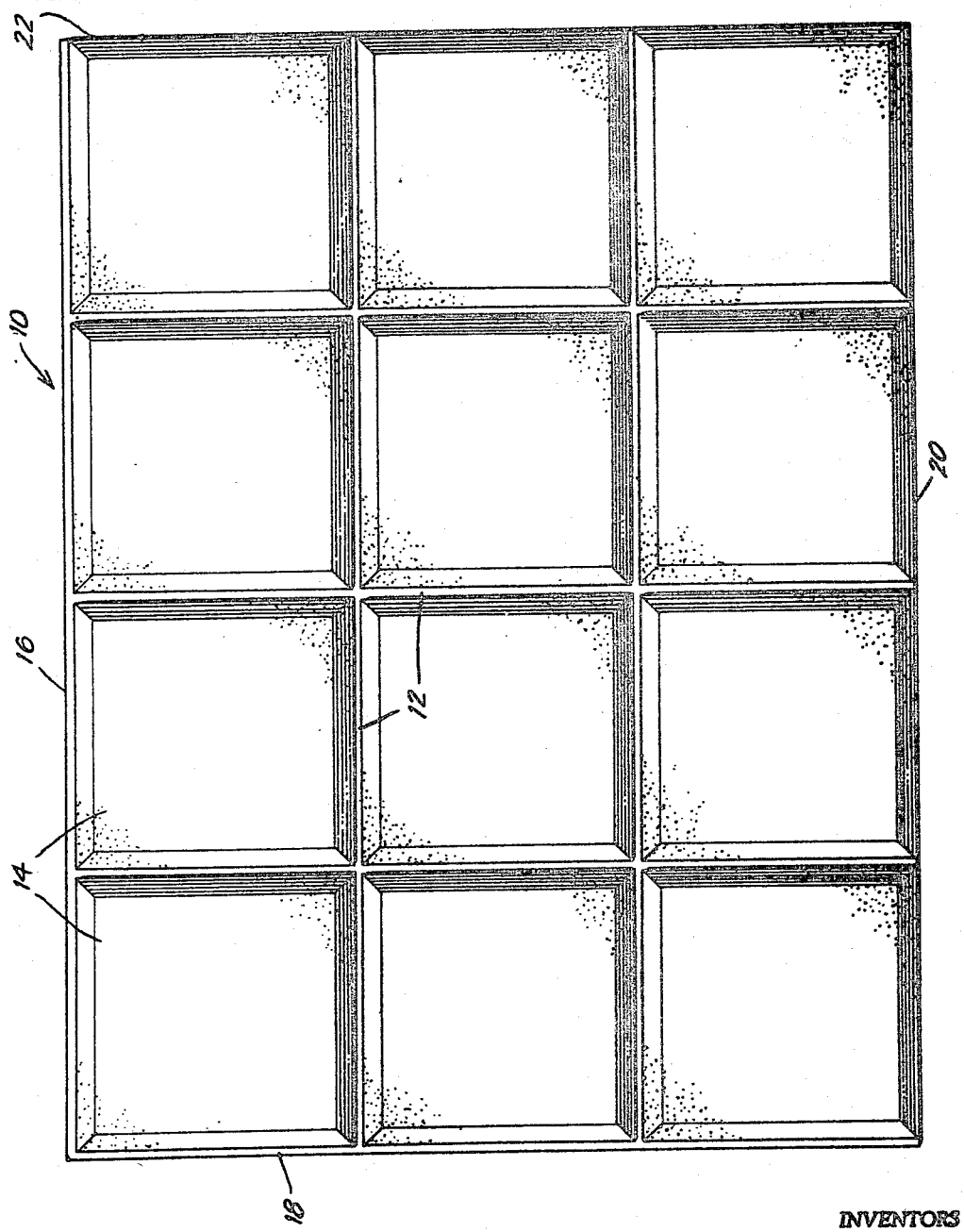

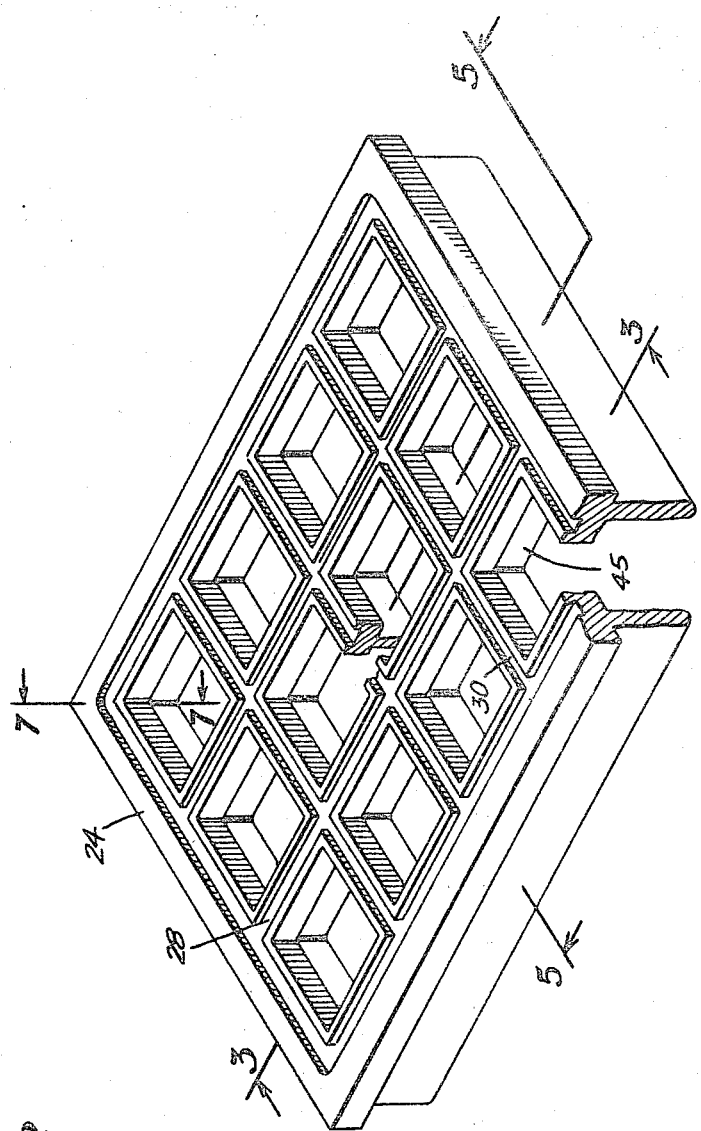

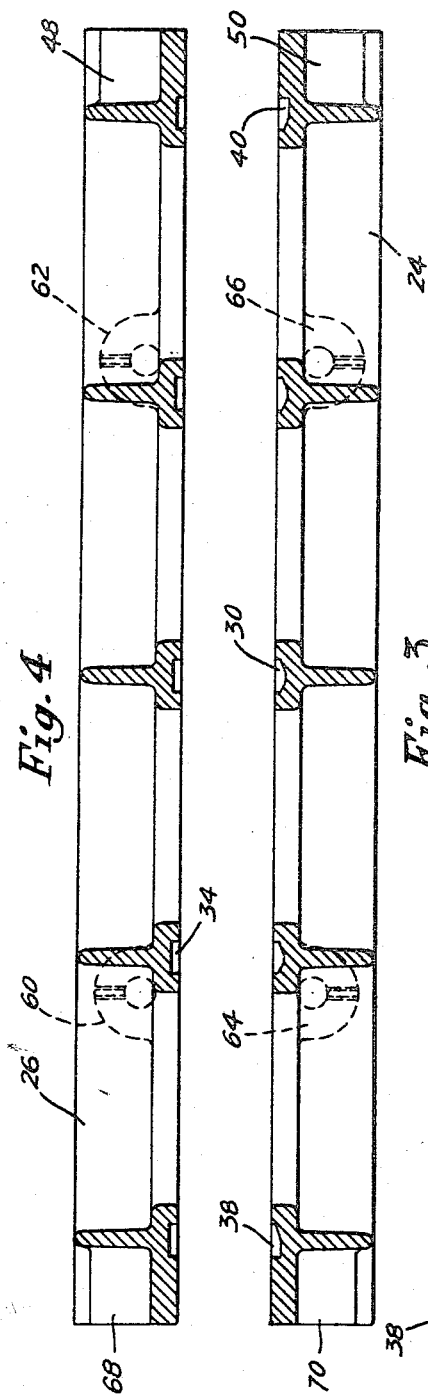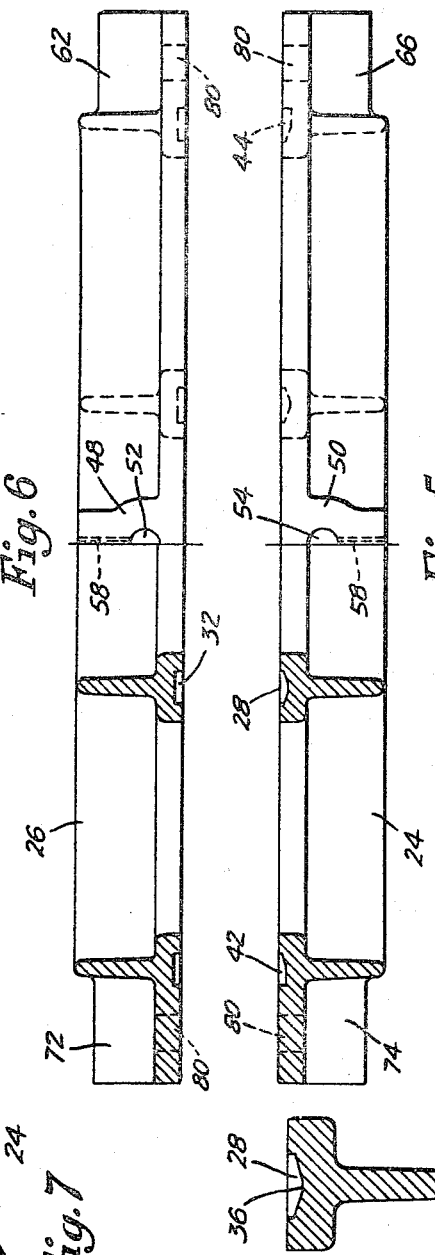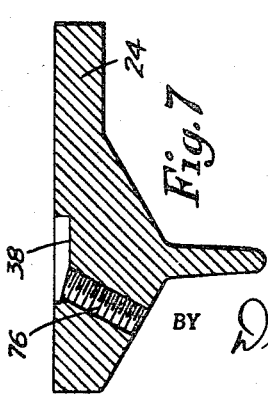

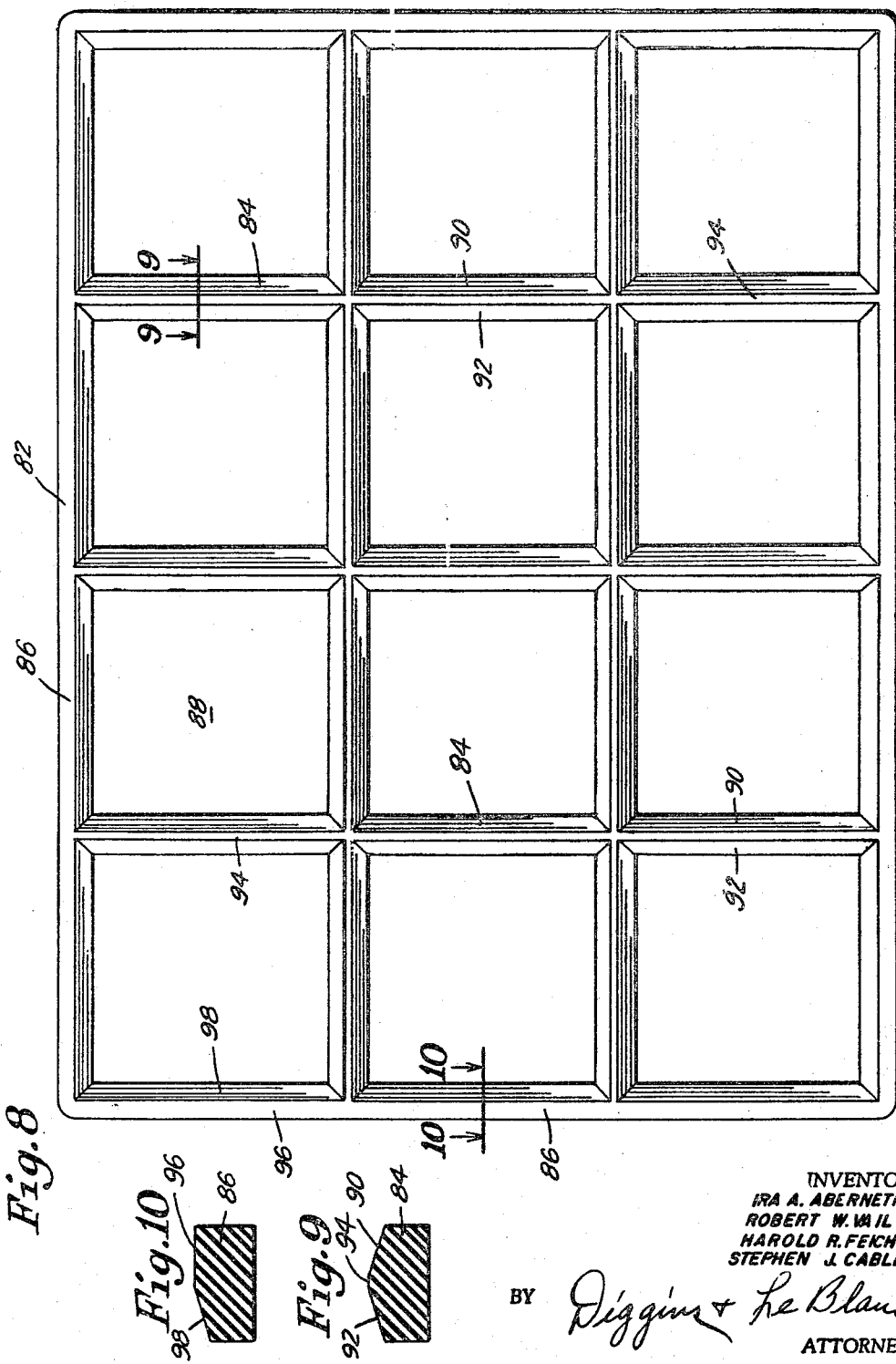

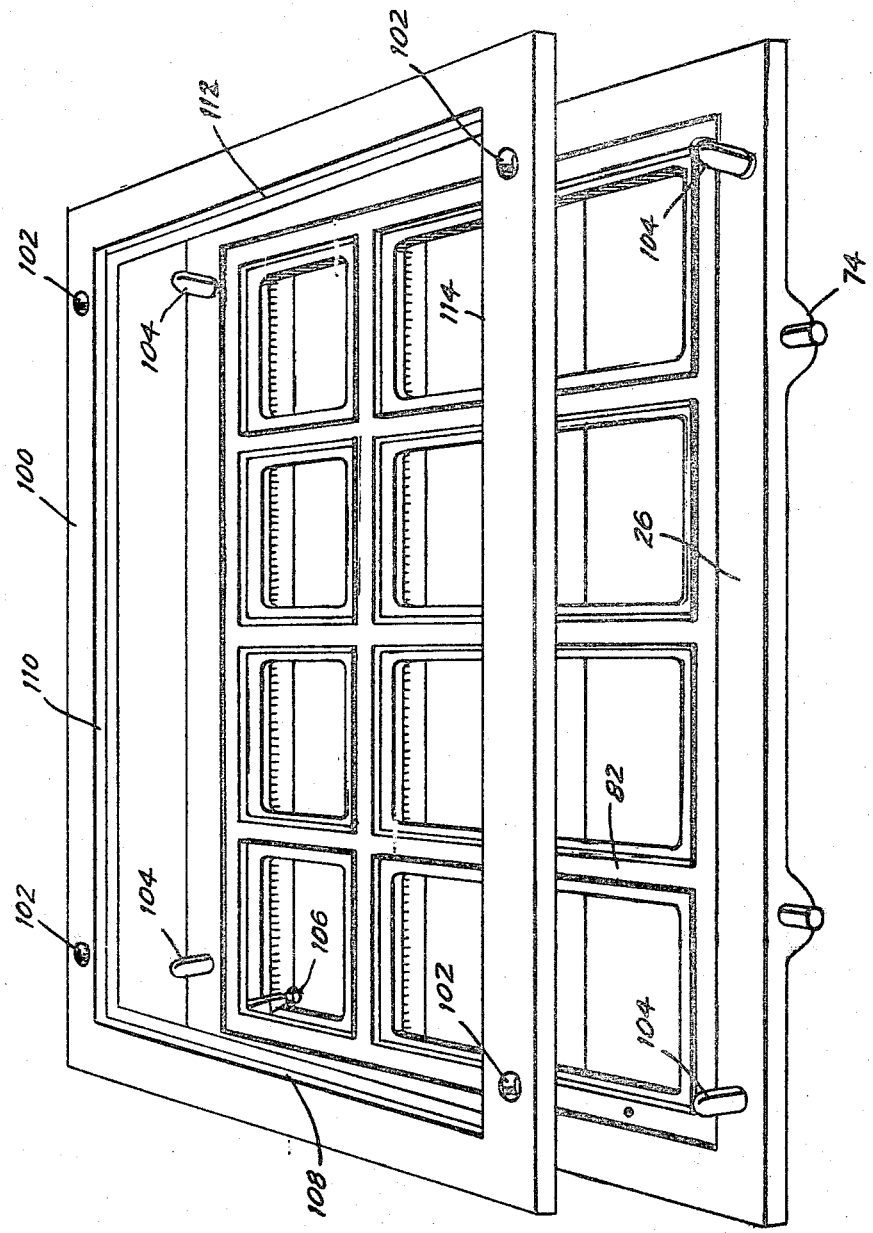

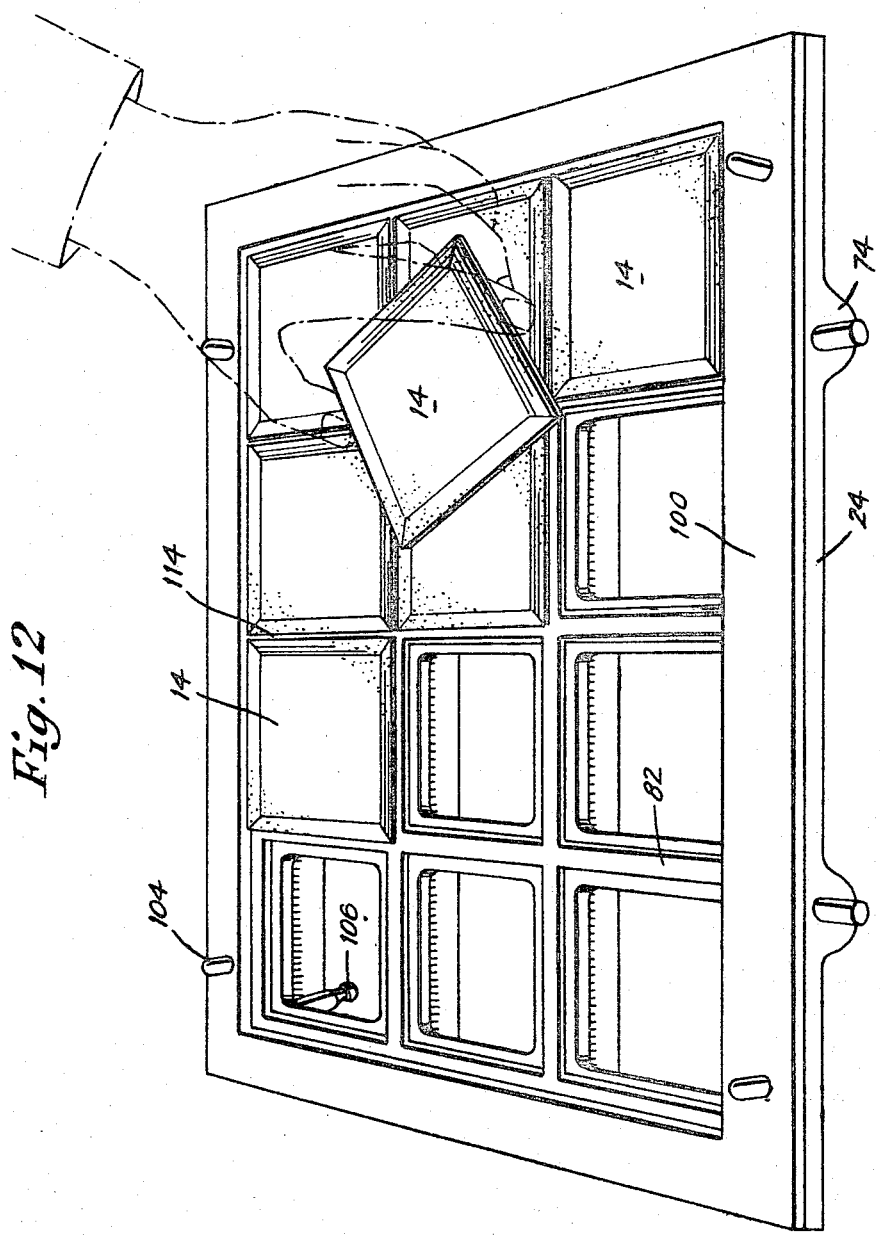

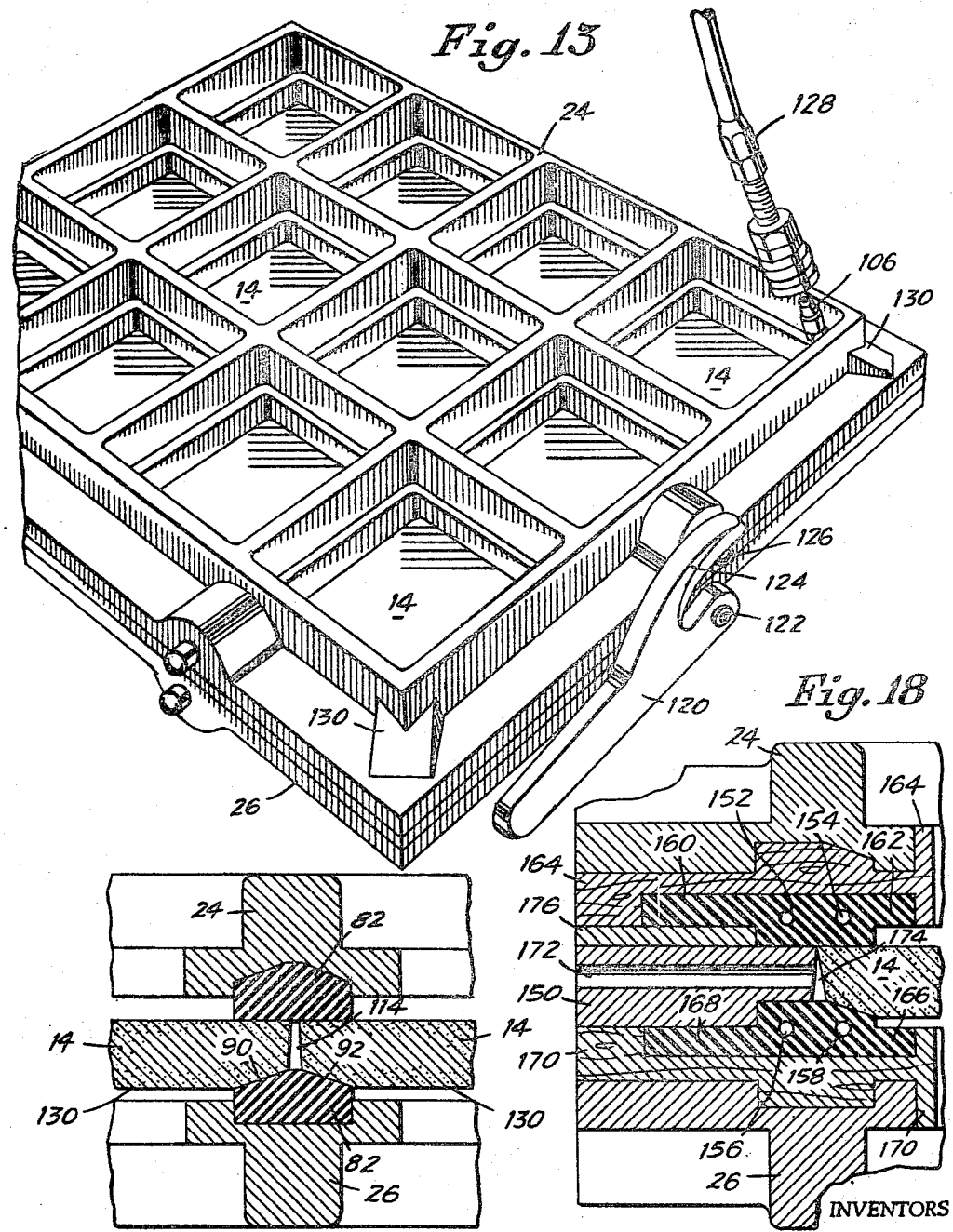

3,192,567
MOLD ASSEMBLY FOR FORMING PREGROUTED CERAMIC TILE SHEETS
Ira A. Abernethy, Canton, Robert W. Vail, Burton, Harold R. Feichter, Massillon, and Stephen J. Cable, Canton, Ohio, assignors to United States Ceramic Tile Co., Canton, Ohio, a corporation of Delaware
Filed Nov. 28, 1960, Ser. No. 72,113
3 Claims. (Cl. 18—36)

This invention relates to pregrouted tile and more particularly to an apparatus for forming pregrouted sheets of ceramic wall tile.

In commonly assigned copending applications Serial Nos. 33,657 filed June 3, 1960, now abandoned, and 40,864 filed July 5, 1960, there is disclosed a novel sheet arrangement for pregrouted ceramic tile. The pregrouted sheets of those applications, both as floor and wall tiles, provide arrangements which avoid the necessity for the tiles to be set individually by hand on the surface to be covered. At the present time, hand grouting is used quite extensively in that it is necessary to apply grouting cement or similar grouting material between the individual tiles after they have been placed on the wall. The ultimate appearance of the tiled surface depends importantly upon the neatness and accuracy with which the tile mechanic performs this grouting operation. Tile grouting as practiced is a laborious hand operation requiring a high degree of skill and a good deal of time and painstaking labor greatly increasing the cost of tile installation.

The present invention provides a novel apparatus for producing the tile sheets disclosed in the aforementioned copending applications, and while useful in conjunction with the installation of any type of ceramic tile, is particularly suited for use with the larger wall tile. The present invention provides a molding apparatus for filling up the spaces between a plurality of individual ceramic tiles to accomplish a commercial surface grout finish on the completed tile sheet, at least equal in appearance to the best hand-tiled surface. An important feature of the present invention lies in the fact that the finished sheets may be trimmed at the factory if desirable to compensate for any warping or size variation of the individual tiles so as to provide an accurately dimensioned tile surface with uniform grout lines.

It is therefore a primary object of the present invention to provide an improved apparatus for forming pregrouted ceramic tile sheets.

It is another object of the present invention to provide a commercial mold for pregrouting tiles so that the tiles may be set at the point of installation without any hand grouting.

Another object of the present invention is to provide a mold assembly for producing tile sheets and assemblies with a uniform grout line.

Another object of the present invention is to provide an arrangement for producing pregrouted tile assemblies with flexible resilient grouting joints between individual tiles so that stress cracking of the tiles and crazing and cracking of the grouting material is eliminated or minimized.

Another object of the invention is to provide an arrangement for producing pregrouted ceramic tiles with plastic grouting material which may be varied in color and texture to provide a variety of visual effects.

Another object of the present invention is to provide improved mold apparatus for producing pregrouted ceramic tile.

These and further objects and advantages of the invention will be more apparent upon reference to the following specification, claims and appended drawings wherein:

FIGURE 1 shows a twelve-tile pregrouted ceramic tile sheet constructed in accordance with the present invention;

FIGURE 2 is a perspective view of one of the two mold sections used in conjunction with the present invention;

FIGURE 3 is a longitudinal cross-section taken along line 3—3 of FIGURE 2 through the bottom mold section;

FIGURE 4 is a longitudinal cross-section similar to FIGURE 3 through the top mold section;

FIGURE 5 is a partial transverse section through the bottom mold section taken along line 5—5 of FIGURE 2;

FIGURE 5a is an enlarged view of one of the intermediate grooves in the bottom mold section of FIGURE 5;

FIGURE 6 is a partial transverse cross-section similar to FIGURE 5 through the upper mold section;

FIGURE 7 is a cross-section through a corner of the mold taken along lines 7—7 of FIGURE 2;

FIGURE 8 is a plan view of one of the silicone rubber gaskets used in conjunction with the present invention;

FIGURE 9 is a cross-section through the gasket taken along line 9—9 of FIGURE 8;

FIGURE 10 is a cross-section through the gasket taken along line 10—10 of FIGURE 8;

FIGURE 11 shows the lower mold section with the dividing frame about to be placed thereon;

FIGURE 12 illustrates the manner of placing the ceramic tiles in the lower mold section;

FIGURE 13 shows the two mold sections clamped together and turned over for the application of liquid grouting material;

FIGURE 14 is a partial cross-section through an interior portion of the mold assembly;

FIGURE 15 is a partial cross-section through a grouted edge of the mold assembly;

FIGURE 16 is a partial cross-section through a non-grouted edge of the mold assembly;

FIGURE 17 shows a modified open mold assembly and

FIGURE 18 is a partial cross-section through a grouted edge of the mold assembly of FIGURE 17.

Referring to the drawings, FIGURE 1 shows a pregrouted tile sheet generally indicated at 10 composed of twelve individual ceramic tiles 14. While the present invention is applicable to all types and sizes of ceramic tile, the tiles 14 are preferably 4¼ x 4¼ x 11/32 inches thick cushion edge ceramic wall tile. The upper surface of the tiles are glazed and the edges are precision ground. The tile sheet illustrated in FIGURE 1 is four tiles wide and three tiles long; however, any reasonable number of tiles may be joined to form a unitary tile sheet.

Between each tile is a uniform line of grout of suitable thermosetting resin 12. A full width line of grout material is also supplied to two adjacent edges 16 and 18 of the tile sheet while edges 20 and 22 are grout free. While the present invention is described in conjunction with a tile sheet having grouting material on two adjacent edges it is understood that the invention is equally applicable to the formation of sheets with grout on any of the edges desired. The grout material is preferably a flexible, elastomeric thermosetting plastic but other types of grout material may also be used for the pregrouting of the tile. Preferred grout materials include polyurethane and polyvinyl chloride. When utilizing a vinyl plastisol grout, it is sometimes desirable to precondition the tiles 14 by applying a primer to the tile edge prior to placing the assembly in the mold, as more fully described below.

FIGURE 2 illustrates a simplified perspective view of the lower mold section 24 used in making the tile sheet of FIGURE 1. Portions of the mold 24 are shown as broken away to illustrate the nature of the mold construction. FIGURES 3 and 4 are longitudinal cross-sections through the lower mold section 24 and a corresponding upper mold section 26 respectively. FIGURE 3 is taken along line 3—3 of FIGURE 2. FIGURES 5 and 6 are partial cross-sections through the lower and upper mold sections 24 and 26 respectively, with the lower half section in FIGURE 5 taken along line 5—5 of FIGURE 2.

The lower and upper molds 24 and 26 are similar in construction except for the shape of the grooves formed therein. Lower section 24 is provided with a series of longitudinal grooves 28 and a second series of transverse grooves 30. An enlarged view of one of the intermediate grooves 28 is illustrated in FIGURE 5a. Upper mold 26 similarly is provided with longitudinal grooves 32 and transverse grooves 34. Grooves 32 and 34 of the upper mold are all of rectangular cross-section. The intermediate grooves on the lower mold section, as best seen at 28 in FIGURE 5a, taper downwardly to a central flat portion 36. Edge grooves 38, 40, 42 and 44 in the lower mold are all formed with a right angle portion around the outer edge of the mold and have a taper similar to groove 28 at the groove edge facing the center of the mold.

Both mold sections are preferably formed of aluminum or other good heat conducting, quick cooling metal. They form an open waffle-like grid pattern wherein the criss-crossing grooves are separated by open-ended rectangular wells 45. This open waffle-like grid pattern permits greater access of air or other heating medium to the surfaces of the tile and to the grout material during the molding operation. As best seen in FIGURES 3–6, the transverse edges of the molds are provided with mating bosses 48 and 50, having clamping pins 52 and 54 received therein to permit the mold sections to be clamped together. Pins 52 and 54 may be secured in suitable cavities in the bosses which latter are threaded at 56 and 58 for the reception of set screws. Somewhat similar bosses are illustrated by dashed lines at 60, 62, 64 and 66 along the longitudinal edges of both mold sections in FIGURES 3 and 4. These bosses similarly receive clamping pins secured by set screws in the manner of the bosses 48 and 50 described above. Clamping bosses 68, 70, 72 and 74 are also provided around the opposite edges of the molds in FIGURES 3–6.

Besides the different cross-sectional configurations of the grooves in the upper and lower mold sections, the single remaining difference between the two mold sections is best illustrated in FIGURE 7 taken along line 7—7 of FIGURE 2. This figure shows the filling sprue 76 provided in the lower mold section to permit access of fluid grout material to the spaces intermediate the tiles. As shown, filling sprue 76 is threaded to receive a filling attachment and communicates with the groove 38 at the corner of the lower mold through a suitable aperture in the lower gasket. Sprue 76 is preferably provided at the corner of the lower mold which defines the juncture of the two grouted edges of the sheet 10 of FIGURE 1. Both mold sections are preferably provided with apertures indicated by dashed lines at 80 adapted to receive dowels for aligning the mold sections during the molding operation.

FIGURE 8 illustrates one of the two resilient rubber gaskets utilized in the mold assembly of the present invention. Since both gaskets are identical, except that the lower gasket is provided with a filling sprue aperture and exhaust vent apertures, only one is illustrated at 82 in FIGURE 8. FIGURES 9 and 10 are cross-sections taken along lines 9—9 and 10—10 of FIGURE 8 respectively. FIGURE 9 illustrates the cross-sectional configuration of gasket 82 through one of the intermediate webs 84 which, in conjunction with gasket edges 86, define rectangular openings 88. Openings 88 during operation are aligned with the wells 45 formed in the mold sections as illustrated in FIGURE 2. As seen in FIGURE 9, the lower portion of the gasket 82 is formed of rectangular configuration with upper tapered surfaces 90 and 92 defining a flat central band 94. FIGURE 10 illustrates the edge web 86 as having a rectangular bottom, a flat outer surface 96 and a tapering inner upper edge surface 98. The rectangular bottom edges of the gasket 82 are constructed to be received in the rectangular channels 32 and 34 of the upper mold section 26. The upper tapered surfaces of a similarly constructed gasket are likewise received in the channels 28 and 30 of the lower mold section 24 of FIGURES 3–6. While any suitable gasket material may be employed, the gaskets of the present invention are preferably formed of silicone rubber suitably filled for low thermal expansion and pressure set, having a hardness durometer test reading of 68–70. By keeping the cross sectional dimensions of the gasket webs at a minimum, it is possible to reduce the thermal coefficient of expansion of the silicone rubber so that its effect on the molding process is negligible.

FIGURE 11 shows the mold construction during an intermediate stage of assembly with a separating metallic mold frame 100 about to be placed over the lower mold section 24. Frame 100 is provided with corner apertures 102 adapted to be received over dowel pins 104 provided in the lower mold section. One of the gaskets 82 has previously been inserted in the grooves of the lower mold section and frame 100 is placed over the gasket. A filling connection 106 is illustrated as threaded into the sprue hole previously described in the corner of the lower mold section. Frame 100 is provided with adjacent grouting edges 108 and 110 which define the grouted edge portions of sheet 10 in FIGURE 1 as well as non-grouted edges 112 and 114.

FIGURE 12 illustrates a further stage of assembly wherein the frame 100 is secured over the lower mold section 24 and the tiles 14 are being placed over the lower gasket 82. The tiles may be positioned by hand, or if desired, can be placed in position over the gasket by suitable automatic machinery. The tiles 14 are slightly spaced as indicated at 114 to provide an area for the grout material between adjacent tiles. Individual tiles automatically adjust to this spacing because of the cross sectional configuration of the gasket illustrated in FIGURES 8–10. The edges of the tiles tend to contact the upper edge of sloping surfaces 90 and 92 in FIGURE 9 with the spacing 114 approximating the width of the flat band 94 in FIGURE 9. Similarly, the tile edges at the outer edge of the tile sheet terminate at the upper edge of beveled surface 98 formed on the edge webs of the gasket. As a result it is possible to quickly place the tiles over the gasket 82 in FIGURE 12 without being particular as to placement since the tiles will be automatically positioned by the beveled surfaces 90, 92 and 98 of the upper gasket when the upper mold section is placed over the tiles. The tiles 14 in FIGURE 12 are placed on the flat bottom surfaces of the gasket 82 illustrated in that figure since the beveled edges of the lower gasket are received in the cooperating beveled slots 28 and 30 of the lower mold section. Of course by reversing the positions of the gaskets this automatic spacing can be obtained at the time the tiles are placed on the lower mold section.

FIGURE 13 illustrates the complete mold assembly with the upper and lower sections of the molds securely clamped together by a plurality of eccentric clamps, one of which is illustrated at 120. The clamp is provided with an aperture encircling a lower clamping pin 122 and includes an eccentrically tapering upper arm 124 engaging a similar pin 126 in the adjacent mold section. In FIGURE 13 the mold sections have been joined together and inverted so that lower mold 24 now appears at the top of the mold assembly and upper mold 26 appears at the bottom. The tiles 14 are securely clamped against the upper and lower gaskets between the mold sections and a suitable filling line for fluid grout material indicated at 128 is ready for attachment to the filling fixture or spout 106. If desired, the mold sections may be reinforced at the corners by integral reinforcing blocks 130. The underside or unglazed surface of the tile now faces the top of the mold assembly in FIGURE 13.

FIGURES 14, 15 and 16 show partial cross sections through the mold assembly of FIGURE 13 and illustrate the manner in which the individual tiles 14 are supported by the resilient gaskets. FIGURE 14 shows a cross section through an intermediate web of the gaskets with the mold sections inverted so that the lower mold section 24 is above upper mold section 26 in the same manner as is illustrated in FIGURE 13. Adjacent tiles 14 are spaced by the slanted or beveled surfaces 90 and 92 of the lower gasket 82 so as to define the spacing 114 between adjacent tiles for the fluid grout material. The tiles 14 are formed in a conventional manner with beveled edges so that the grout spacing is greater adjacent the glazed surface 130 of the tile.

FIGURE 15 is a partial cross section through the mold assembly of FIGURE 13 along one of the grout edges 16 and 18 of the tile sheet of FIGURE 1. The adjacent edges 132 of tile 14 and 134 of frame 100 are both tapered from the back towards the glazed surface 130 of the tile leaving a space 136 to be filled by the grout 16 or 18. A metallic shim 138 is provided between the mold sections 24 and 26 to properly space the mold assembly.

FIGURE 16 is a partial cross section through a non-grouted edge of the mold assembly corresponding to one of the non-grouted edges 20 and 22 of the tile sheet of FIGURE 1. Along this edge of the tile 14 the frame 100 is provided with an inwardly tapering surface 140 so that it tightly abuts the adjacent edge of the tile 14. As a result, no fluid grout is permitted between these adjacent surfaces and the outer edge of the tile is grout free.

While the gaskets 82 have been described in conjunction with silicone rubber, other resilient materials may be used such as plain rubber or fluorinated silicone, depending upon the type of grout material being used to grout the tile sheet. In operation, the lower gasket 82 is first inserted in the tapered grooves of the lower mold section 24. The frame is then placed on top of the gasket and over the dowel pins in the lower mold section. Next, the tiles are inserted in place, glazed face up, over the lower gasket with the edges suitably primed if the grout material is to be a vinyl plastisol. Suitable acrylic or epoxy resins may be used as primers and the plastisol, if desired, may be utilized in conjunction with the plasticizers, stabilizers, fillers and the like. Priming of the tile edges is not needed with some resins such as urethane.

The upper gasket is then inserted in the rectangular channels of the upper mold section and, with the shim in place, is clamped over the lower mold section. The assembly is then inverted to the position shown in FIGURE 13 and the supply of liquid grout attached to the fitting 106 in mold section 24. Vent passages are preferably provided in the mold sections to permit the escape of air from the group passages. Filling or injection of the liquid grout material from a suitable pressurized liquid supply tank is instantaneous and automatic. When the vent holes begin exhausting the liquid grout material, the mold is considered filled. The vent holes allow for expansion and overflow of the liquid grout material during the fusing cycles.

The filled and injected mold is then placed in a circulating hot air chamber which is maintained at an elevated temperature in excess of the grout fusing temperature required. Surge type heating generally allows shorter heat cycling of the mold. When the proper predetermined interval has elapsed, the mold is removed from the oven and placed in a cooling area. Forced cooling may be used and can be either air or water mist to reduce the mold temperature approximately 50° F. below fusing temperature. At this point, the mold is opened and the completely grouted sheet 10 removed from the mold.

The mold may be immediately recycled while the sheet just removed from the mold is inspected and lightly belt-sanded along the two non-grouted edges to remove any grout flash that may be present. The belt-sanding step provides for perfect mating and sealing between grouted ceramic tile sheets in commercial installations.

The size of the grout joint in the embodiment shown, i.e., the spacing between adjacent tiles, is 3/32 of an inch on the glaze face side of the sheet and 1/32 of an inch on the back surface of the sheet. Curing and fusing temperature of the grout material ranges from 300–350° F. Curing time ordinarily runs from 8–10 minutes and the mold is then cooled to 50° F. or more below the curing temperatuer by a cold vapor mist applied to the mold and glazed face of the tile for approximately a two-minute period.

FIGURE 17 shows a modified mold assembly used in conjunction with electrical heating. FIGURE 18 shows a partial cross-section through a grouted edge of the mold assembly of FIGURE 17. In FIGURE 17, lower and upper mold sections 24 and 26 are again utilized in conjunction with a modified frame 150. The mold sections 24 and 26 are identical to those previously described with the exception that the injection sprue is omitted from lower mold 24. Overlying the grillwork of bottom mold section 24 is a heat insulating silicone rubber gasket 152 having heating wires 154 embedded therein. Over the grillwork of the upper mold section 26 is a second silicone rubber gasket 156 and it may also have heating wires 158 passing therethrough.

Gasket 152 is provided with flanges 160 and 162 which overlie a carrissa wood liner 164. Liner 164 passes beneath the gasket and overlies the upper mold section 24 on both sides of the grooves as clearly seen in FIGURE 18. Lower gasket 156 similarly includes flanges 166 and 168 which overlie a second carrissa wood liner 170. Frame 150 is provided with a sprue aperture 172 providing access for fluid grout to the space 174 between the frame and the edge of tile 14. A shim 176 is provided for proper spacing. In all other respects, the mold assembly of FIGURES 17 and 18 is similar to that previously described.

Insulating liners 164 and 170 are secured by suitable adhesive to the grooves or channels in the cast aluminum mold sections 24 and 26. Gaskets 152 and 156, with the heating wires embedded therein, are then secured by suitable adhesive to the insulating wood liners. The mold is assembled as before and may or may not be inverted to the position shown in FIGURE 18 as desired. The electric current from a suitable supply is passed through wires 154 and 158 to heat the injected grout material passed in through sprue aperture 172 to the desired curing temperature. The electric mold of FIGURES 17 and 18 is not placed in a circulating hot air oven since, by the induction of the electric current, it generates its own heat because of the heating elements embedded in the silicone rubber seals.

Although the invention is described with grout material applied to two edges, the tile sheets may be pregrouted along any desired number of edges, adjacent or otherwise. By properly spacing the edge tiles from the dividing frame 100 or 150 and giving the desired contour to the inner edge of the frame, it is possible to vary the thickness and shape of the grout edges in any of a wide variety of ways from zero grout width to full grout width or more. In some instances, it is desirable to pregrout only one edge and in other cases grout around all edges is more suitable. Furthermore, in certain circumstances, it has been found necessary to change the grout configuration at different edges such as making some edges full width and others only half width. Different grout shapes along different edges are particularly important in situations requiring welding edges for welding a multiplicity of sheets together at the job site. This welding is accomplished through the application of a solvent to the plastisol grout edges and bringing the thus softened edges into tight adhering contact.

From the above, it is apparent that the present invention provides a novel pregrouting assembly for ceramic tile which accomplishes a commercially acceptable surface grout finish on a completed tile sheet of any desired number of individual ceramic tiles. Grout material is injected into the mold system in liquid form and only becomes fused into an elastomeric solid at the elevated fusing or curing temperature. The mold system is constructed to give good heat conductance, to provide ease of handling and to withstand the elevated temperatures to which it is subjected. The particular groove arrangement disclosed is self-cleaning and the aluminum mold elements provide for rapid cooling in conjunction with the generally open framework of the overall construction. The mold system provides two adjacent full grout edges and two adjacent grout free edges on the ceramic tile sheet. The appearance of the finished tile is equal to the best manual job performed by a skilled mechanic. Tiles may be assembled on a surface to be covered much more quickly without requiring the skill and patience involved in present-day hand-tiled construction. The intermediate elastomeric grout material imparts a certain amount of flexibility to the sheets, thus completely obviating any possibility of breakage during handling and permitting greater ease of installation.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mold assembly for forming pregrouted ceramic tile sheets comprising upper and lower mating mold sections, said sections being formed of a plurality of criss-crossing ribs separated by opened wells, a plurality of criss-crossing grooves formed in the faces of said mold sections midway of said ribs, a resilient gasket received in the grooves of each mold section, said gaskets each forming an aligned lattice network of criss-crossing ribs extending above the faces of said mold adapted to support the edges of spaced ceramic tiles bridging said wells, means for clamping said mold sections together whereby the peripheral edges of the tiles are clamped between the aligned ribs of said gaskets to define an enclosed grout space between adjacent tiles, a frame for engaging the peripheral edges of said gaskets, said frame having two adjacent inner edges tapered to tightly abut the edges of the tiles clamped between said mold sections and two other adjacent inner edges tapered to define a space for grout material between said other edges and the edges of tiles clamped between said mold sections, a grout filling sprue communicating with the juncture of said grout spaces along said two other edges of said frame, means for injecting fluid grout material into said clamped mold sections to fill the spaces between adjacent tiles, and means for heating said clamped mold sections to cure said grout material to a flexible elastomer.

2. A mold assembly for forming pregrouted ceramic tile sheets comprising upper and lower mating mold sections, said sections being formed of a plurality of criss-crossing ribs separated by opened wells, a plurality of criss-crossing grooves formed in the faces of said mold sections midway of said ribs, a resilient gasket received in the grooves of each mold section, said gaskets each forming in aligned lattice network of criss-crossing ribs extending above the faces of said mold adapted to support the edges of spaced ceramic tiles bridging said wells, means for clamping said mold sections together whereby the peripheral edges of the tiles are clamped between the aligned ribs of the gaskets to define an enclosed grout space between adjacent tiles, the outer surface of one of said gaskets being flat and the outer surface of the other of said gaskets being bevelled to define an intermediate rib, said bevelled surface being formed to engage the bevelled glazed surface edge of a ceramic tile, means for injecting fluid grout material into said clamped mold sections to fill the spaces between adjacent tiles, and means for heating said clamped mold sections to cure said grout material to a flexible elastomer.

3. A mold assembly for forming pregrouted ceramic tile sheets comprising upper and lower mating mold sections, said sections being formed of a plurality of criss-crossing ribs separated by opened wells, a plurality of criss-crossing grooves formed in the faces of said mold sections midway of said ribs, a resilient gasket received in the grooves of each mold section, said gaskets each forming an aligned lattice network of criss-crossing ribs extending above the faces of said mold adapted to support the edges of spaced ceramic tiles bridging said wells, a heat insulating liner between said gaskets and said mold sections, means for clamping said mold sections together whereby the peripheral edges of the tiles are clamped between the aligned ribs of said gaskets to define and enclose grout space between adjacent tiles, means for injecting fluid grout material into said clamped mold sections to fill the spaces between adjacent tiles, and means for heating said clamped mold sections to cure said grout material to a flexible elastomer comprising an electric heating wire embedded in at least one of said gaskets.

References Cited by the Examiner

UNITED STATES PATENTS

| | | | |
|---|---|---|---|
| 2,521,128 | 9/50 | Ramsay. | |
| 2,572,580 | 10/51 | Almroth et al. | 18—59 |
| 2,707,802 | 5/55 | Gard. | |
| 2,718,829 | 9/55 | Seymour | 18—61 |
| 2,732,605 | 1/56 | Johnson | 18—60 |
| 2,777,184 | 1/57 | Monk et al. | 25—1 |
| 2,781,554 | 2/57 | Robinson | 25—1 |
| 2,822,576 | 2/58 | Rowe. | |
| 2,825,221 | 3/58 | Brouk | 18—61 |
| 2,972,783 | 2/61 | Russell et al. | 25—1 |

FOREIGN PATENTS 821,897    10/59    Great Britain.

ALEXANDER H. BRODMERKEL, *Primary Examiner.*

MICHAEL V. BRINDISI, ROBERT F. WHITE, MORRIS LIEBMAN, *Examiners.*